US012665124B2

(12) United States Patent
Nagai et al.

(10) Patent No.: US 12,665,124 B2
(45) Date of Patent: Jun. 23, 2026

(54) COIL COMPONENT

(71) Applicant: TDK CORPORATION, Tokyo (JP)

(72) Inventors: Yusuke Nagai, Tokyo (JP); Kazuhiro Ebina, Tokyo (JP); Kunihiko Kawasaki, Tokyo (JP); Shinichi Kondo, Tokyo (JP); Yuya Ishima, Tokyo (JP); Shinichi Sato, Tokyo (JP); Kosuke Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 749 days.

(21) Appl. No.: 18/090,240

(22) Filed: Dec. 28, 2022

(65) Prior Publication Data

US 2023/0215616 A1 Jul. 6, 2023

(30) Foreign Application Priority Data

Jan. 5, 2022 (JP) ................................ 2022-000383

(51) Int. Cl.

| | |
|---|---|
| ***H01F 27/29*** | (2006.01) |
| ***H01F 1/24*** | (2006.01) |
| ***H01F 17/00*** | (2006.01) |

(52) U.S. Cl.

CPC ............. *H01F 27/292* (2013.01); *H01F 1/24* (2013.01); *H01F 17/0013* (2013.01)

(58) Field of Classification Search

CPC ...... H01F 27/292; H01F 1/24; H01F 17/0013; H01F 1/26; H01F 17/04; H01F 27/2804; H01F 27/2852; H01F 27/29; H01F 2027/2809

See application file for complete search history.

(56) References Cited

U.S. PATENT DOCUMENTS

| | | | | |
|---|---|---|---|---|
| 2001/0024739 | A1 | 9/2001 | Mizoguchi et al. | |
| 2004/0166370 | A1 | 8/2004 | Mizoguchi et al. | |
| 2013/0038416 | A1 | 2/2013 | Arai et al. | |
| 2018/0144859 | A1* | 5/2018 | Araki | H01F 27/292 |
| 2019/0198232 | A1* | 6/2019 | Sato | H01F 27/2804 |
| 2020/0303117 | A1 | 9/2020 | Sato et al. | |
| 2020/0335263 | A1 | 10/2020 | Jeon | |

FOREIGN PATENT DOCUMENTS

| | | | |
|---|---|---|---|
| JP | 2001-244123 | A | 9/2001 |
| JP | 2011-003761 | A | 1/2011 |
| JP | 2013-038263 | A | 2/2013 |
| JP | 2020-155702 | A | 9/2020 |

* cited by examiner

*Primary Examiner* — Tuyen T Nguyen
(74) *Attorney, Agent, or Firm* — Oliff PLC

(57) ABSTRACT

A coil component includes: an element body; a coil including a plurality of coil conductors disposed in the element body and electrically connected to each other; an external electrode disposed on the element body; and a connection conductor that connects the coil and the external electrode. The connection conductor has an end portion exposed from an outer surface of the element body and connected to the external electrode. The end portion has a shape extending outward over an entire circumference.

10 Claims, 5 Drawing Sheets

COIL COMPONENT

TECHNICAL FIELD

The present disclosure relates to a coil component. This application is based upon and claims the benefit of priority from Japanese Patent Application No. 2022-000383, filed on Jan. 5, 2022, the entire contents of which are incorporated herein by reference.

BACKGROUND

Japanese Patent Application Laid-Open No. 2013-38263 discloses a multilayer inductor including a magnetic portion formed by laminating a plurality of magnetic layers, a coil disposed in the magnetic portion, and external terminals provided at both end portions of the magnetic portion and connected to the coil.

SUMMARY

An object of the present disclosure is to provide a coil component capable of improving the junction strength between an internal conductor and an external electrode.

A coil component according to a first aspect of the present disclosure includes: an element body; a coil including a plurality of coil conductors disposed in the element body and electrically connected to each other; an external electrode disposed on the element body; and a connection conductor that connects the coil and the external electrode. The connection conductor has an end portion exposed from an outer surface of the element body and connected to the external electrode. The end portion has a shape extending outward over an entire circumference.

In the coil component according to the first aspect of the present disclosure, the connection conductor has the shape expanding outward over the entire circumference in the end portion. This increases the junction area between the connection conductor and the external electrode. Therefore, the junction strength between the connection conductor, which is an internal conductor, and the external electrode can be improved.

A coil component according to a second aspect of the present disclosure includes: an element body; a coil including a plurality of coil conductors disposed in the element body and electrically connected to each other; an external electrode disposed on the element body; and a connection conductor that connects the coil and the external electrode.

The connection conductor has an end portion exposed from an outer surface of the element body and connected to the external electrode. The end portion has a shape in which a cross-sectional area of the end portion gradually increases toward the external electrode.

In the coil component according to the second aspect of the present disclosure, the end portion of the connection conductor has the shape in which the cross-sectional area of the end portion gradually increases toward the external electrode. This increases the junction area between the connection conductor and the external electrode. Therefore, the junction strength between the connection conductor, which is an internal conductor, and the external electrode can be improved.

The element body may include a plurality of element body layers laminated in the first direction. The element body layer may include a plurality of soft magnetic metal particles.

A coil component according to a third aspect of the present disclosure includes: an element body; a coil including a plurality of coil conductors disposed in the element body and electrically connected to each other; an external electrode disposed on the element body; and a connection conductor that connects the coil and the external electrode. The element body includes a plurality of element body layers laminated in a first direction. Each of the plurality of element body layers includes a plurality of soft magnetic metal particles. The connection conductor has an end portion exposed from an outer surface of the element body and connected to the external electrode. A length of the end portion in the first direction is longer than a length of each of the plurality of coil conductors in the first direction. Two or more soft magnetic metal particles are disposed along the first direction between a coil conductor of the plurality of coil conductors and the connection conductor that are adjacent to each other in the first direction.

In the coil component according to the third aspect of the present disclosure, the length of the first direction of the end portion of the connection conductor is longer than the length of the first direction of the coil conductor. This increases the junction area between the connection conductor and the external electrode. Therefore, the junction strength between the connection conductor, which is an internal conductor, and the external electrode can be improved. Further, two or more soft magnetic metal particles are disposed between the connection conductor and the coil conductor along the first direction. As a result, the interlayer withstand voltage between the connection conductor and the coil conductor can be improved.

A line width of the end portion may be greater than a line width of each of the plurality of coil conductors when viewed from the first direction. In this case, the junction area between the connection conductor and the external electrode is reliably increased. Therefore, the junction strength between the connection conductor and the external electrode can be reliably improved.

The external electrode may be a conductive resin layer. In this case, the density of metal particles in the external electrode is lower than that in a configuration in which the external electrode is a sintered metal layer. Therefore, the stray capacitance between the external electrode and the coil conductor can be suppressed.

A length of the end portion in a length direction of the connection conductor may be half or less of a separation distance between the plurality of coil conductors and the external electrode. In this case, a withstand voltage between the end portion and the coil conductor may be secured.

An outer surface of the end portion may be curved so as to be recessed inward of the connection conductor in a cross section orthogonal to the outer surface on which the end portion is exposed. In this case, it is easy to secure a withstand voltage between the end portion and the coil conductor.

A separation distance between the plurality of coil conductors and the external electrode may be longer than a separation distance between adjacent coil conductors of the plurality of coil conductors. In this case, since the voltage applied between the coil conductor and the external electrode is larger than the voltage applied between the adjacent coil conductors, it is easy to secure the withstand voltage of the coil.

The connection conductor may be a plated conductor. In this case, the density of the connection conductor can be increased as compared with the case where the connection conductor is a sintered metal conductor. Therefore, the junction area between the connection conductor and the external electrode can be further increased.

DETAILED DESCRIPTION

Figure 1:
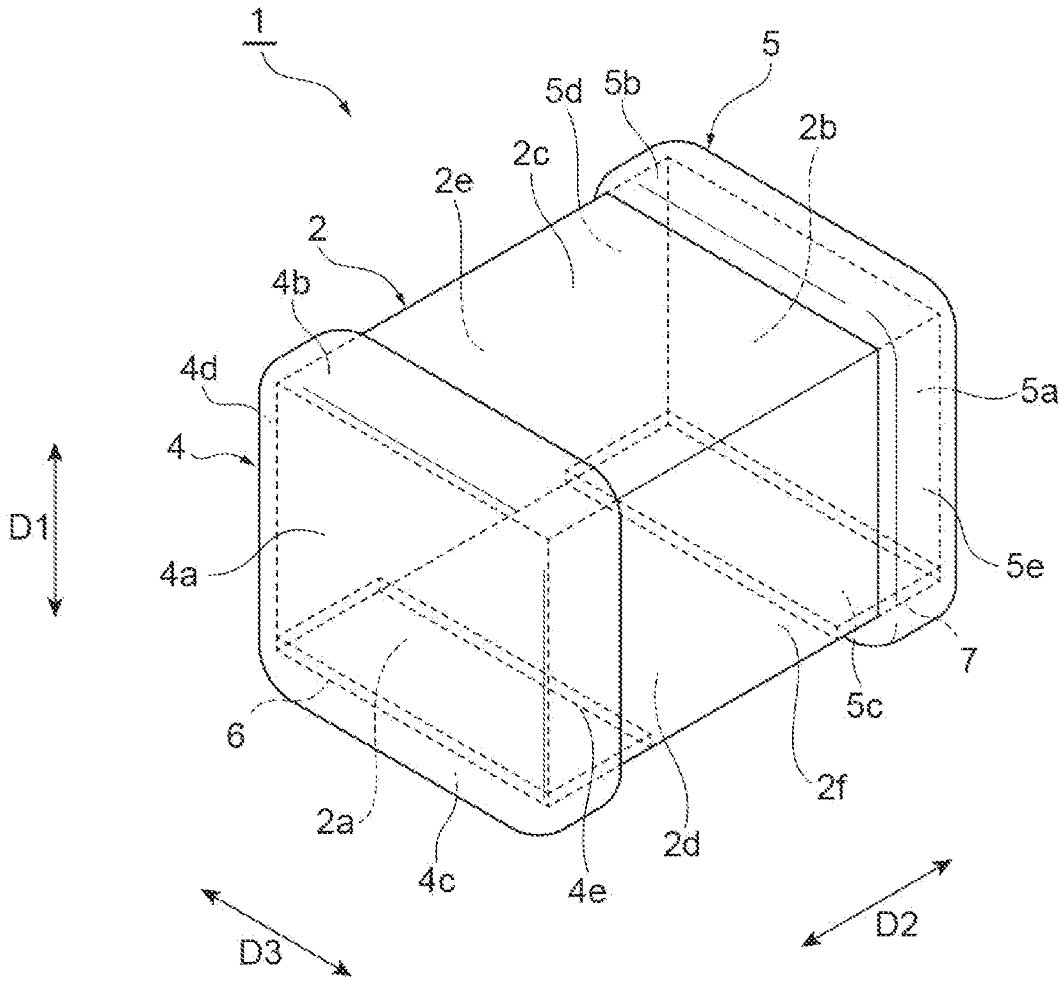
FIG. 1 is a perspective view illustrating a coil component according to an embodiment.

Hereinafter, embodiments will be described in detail with reference to the accompanying drawings. In the description of the drawings, the same or corresponding elements are denoted by the same reference numerals, and redundant description is omitted.

As shown in FIG. 1, a coil component 1 according to the embodiment includes an element body 2, a first external electrode 4, a second external electrode 5, a first electrode part 6, and a second electrode part 7.

The element body 2 has a substantially rectangular parallelepiped shape. The rectangular parallelepiped shape includes a rectangular parallelepiped shape in which corner portions and ridge portions are chamfered and a rectangular parallelepiped shape in which corner portions and ridge portions are rounded. The element body 2 has, as its outer surface, a pair of end surfaces 2*a* and 2*b* opposing each other, a pair of main surfaces 2*c* and 2*d* opposing each other, and a pair of side surfaces 2*e* and 2*f* opposing each other. An opposing direction in which the pair of main surfaces 2*c* and 2*d* are opposed to each other is a first direction D1. An opposing direction in which the pair of end surfaces 2*a* and 2*b* are opposed to each other is a second direction D2. An opposing direction in which the pair of side surfaces 2*e* and 2*f* are opposed to each other is a third direction D3. In the present embodiment, the first direction D1 is a height direction of the element body 2. The second direction D2 is a longitudinal direction of the element body 2 and is orthogonal to the first direction D1. The third direction D3 is a width direction of the element body 2 and is orthogonal to the first direction D1 and the second direction D2.

The pair of end surfaces 2*a* and 2*b* extends in the first direction D1 so as to connect between the pair of main surfaces 2*c* and 2*d*. The pair of end surfaces 2*a* and 2*b* also extends in the third direction D3 (short side direction of the pair of main surfaces 2*c* and 2*d*). The pair of side surfaces 2*e* and 2*f* extends in the first direction D1 so as to connect between the pair of main surfaces 2*c* and 2*d*. The pair of side surfaces 2*e* and 2*f* also extends in the second direction D2 (long side direction of the pair of end surfaces 2*a* and 2*b*). The main surface 2*d* may be defined as a mounting surface that faces another electronic device (for example, a circuit board or an electronic component) when the coil component 1 is mounted on the other electronic device.

Figure 2:
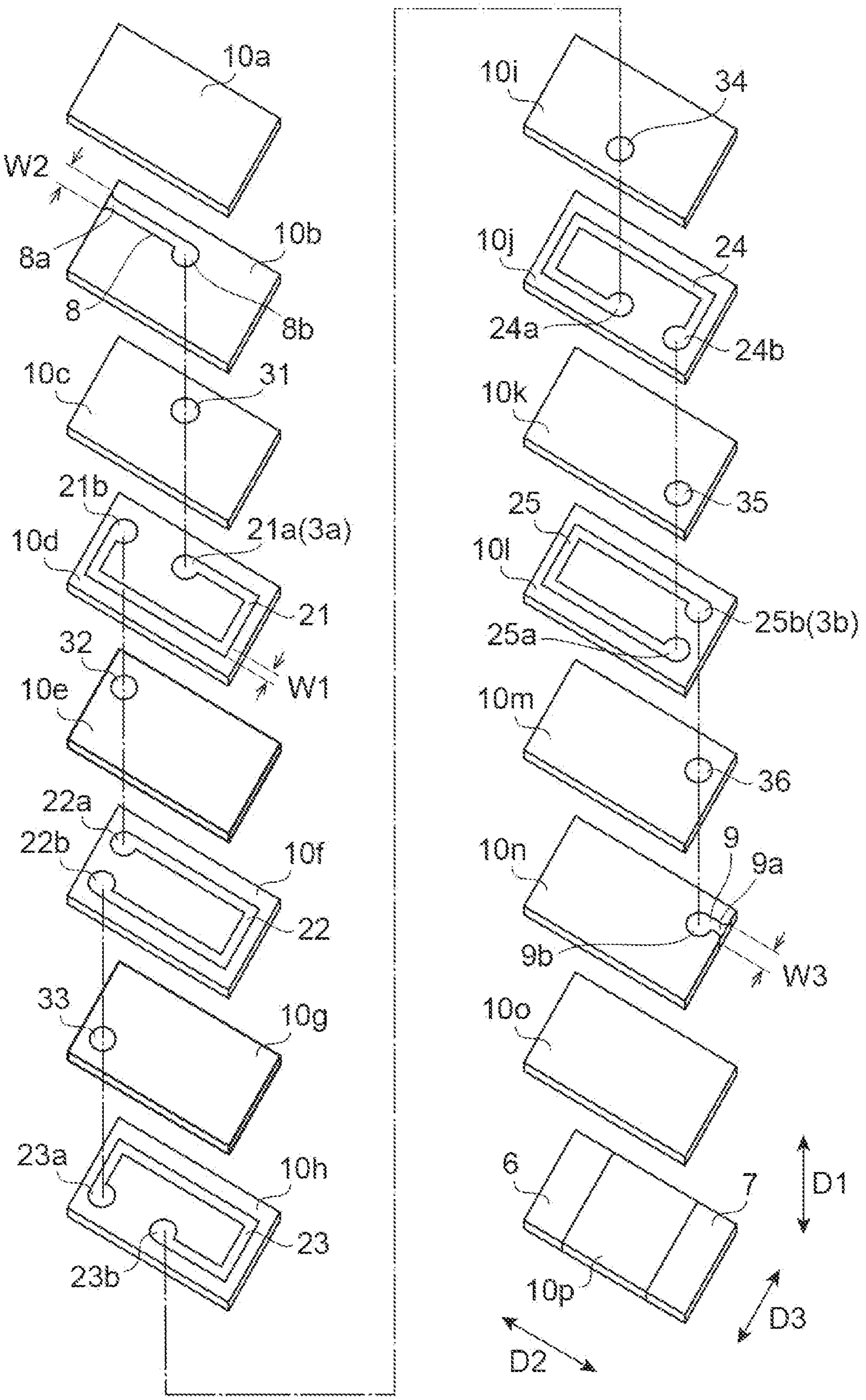
FIG. 2 is an exploded perspective view of the coil component shown in FIG. 1.

As shown in FIG. 2, the element body 2 has a plurality of element body layers 10*a* to 10*p* that are laminated in the first direction D1. The coil component 1 is a multilayer coil component. Each of the element body layers 10*a* to 10*p* is laminated in this order in the first direction D1. That is, the first direction D1 is the laminating direction. In the actual element body 2, the element body layers 10*a* to 10*p* are integrated to such an extent that the boundary between the layers cannot be visually recognized. In FIG. 2, each of the element body layer 10*a* to 10*p* is illustrated one by one, but a plurality of element body layers 10*a* and a plurality of element body layers 10*o* are laminated. The main surface 2*c* is constituted by the main surface of the element body layer 10*a* located at the laminated end. The main surface 2*d* is constituted by the main surface of the element body layer 10*p*.

The thicknesses of each element body layer 10*a* to 10*p* (lengths of the first direction D1) are, for example, 1 μm or more 100 μm or less. In FIG. 2, the thicknesses of the element body layers 10*a* to 10*p* are shown to be equal, but the element body layers 10*b*, 10*d*, 10*f*, 10*h*, 10*j*, 10*l*, and 10*n* are thicker than the element body layers 10*c* 10*e* 10*g* 10*i* 10*k* 10*m* and 10*o*. The coil conductors 21 to 25, a first connection conductor 8, and a second connection conductor 9 described later are provided in the element body layers 10*b*, 10*d*, 10*f*, 10*h*, 10*j*, 10*l*, and 10*n*. The through-hole conductors 31 to 36 described later are provided in the element body layers 10*c* 10*e* 10*g* 10*i* 10*k* 10*m* and 10*o*. The thicknesses of the element body layers 10*b*, 10*d*, 10*f*, 10*h*, 10*j*, 10*l*, and 10*n* are equal to each other in the present embodiment and are, for example, 15 μm or more 100 μm or less. The thicknesses of the element body layers 10*c*, 10*e*, 10*g*, 10*i*, 10*k*, 10*m*, and 10*o* are equal to each other in the present embodiment and are, for example, 1 μm or more 15 μm or less.

Figure 5:
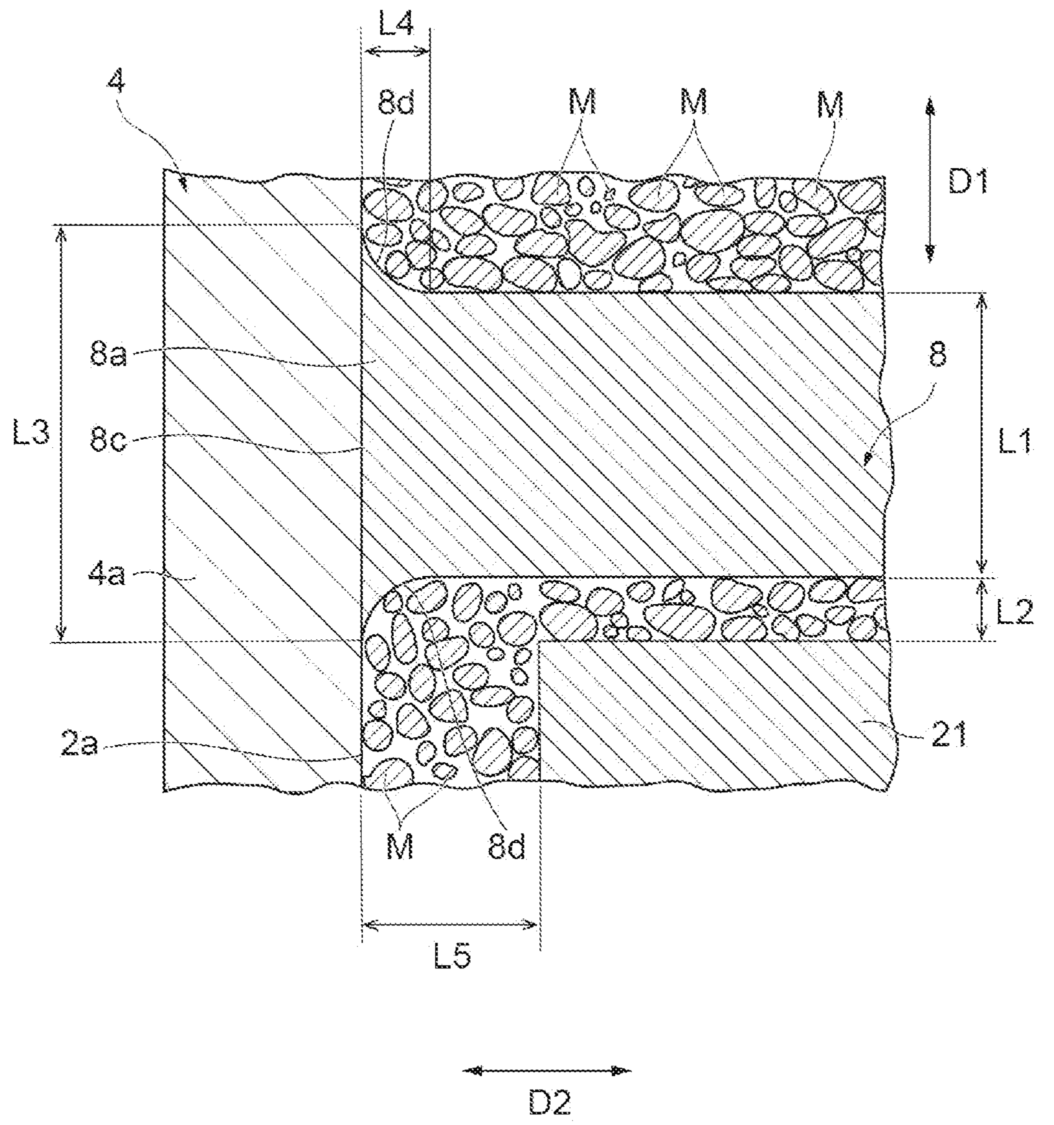
FIG. 5 is a partially enlarged view of FIG. 3.

Each of the element body layers 10*a* to 10*p* includes a plurality of soft magnetic metal particles M (see FIG. 5). The soft magnetic metal particles M is made of a soft magnetic alloy (soft magnetic material). The soft magnetic alloy is, for example, an Fe—Si-based alloy. When the soft magnetic alloy is the Fe—Si-based alloy, the soft magnetic alloy may contain P. The soft magnetic alloy may be, for example, an Fe—Ni—Si-M-based alloy. "M" includes one or more elements selected from Co, Cr, Mn, P, Ti, Zr, Hf, Nb, Ta, Mo, Mg, Ca, Sr, Ba, Zn, B, Al, and rare earth elements.

The soft magnetic metal particles M are coupled to each other in each of the element body layers 10*a* to 10*p*. The coupling between the soft magnetic metal particles M is realized by coupling between oxide films formed on surfaces of the soft magnetic metal particles M, for example. The soft magnetic metal particles M are electrically insulated from each other by coupling of oxide films in each of the element body layers 10*a* to 10*p*. The thicknesses of the oxide films are, for example, 5 nm or more 60 nm or less. The oxide film may include one or more layers.

The element body 2 contains resins. The resins are present between the plurality of soft magnetic metal particles M. The resin is an insulating resin having electrical insulating properties. The insulating resin includes, for example, silicone resin, phenol resin, acrylic resin, or epoxy resin.

Figure 3:
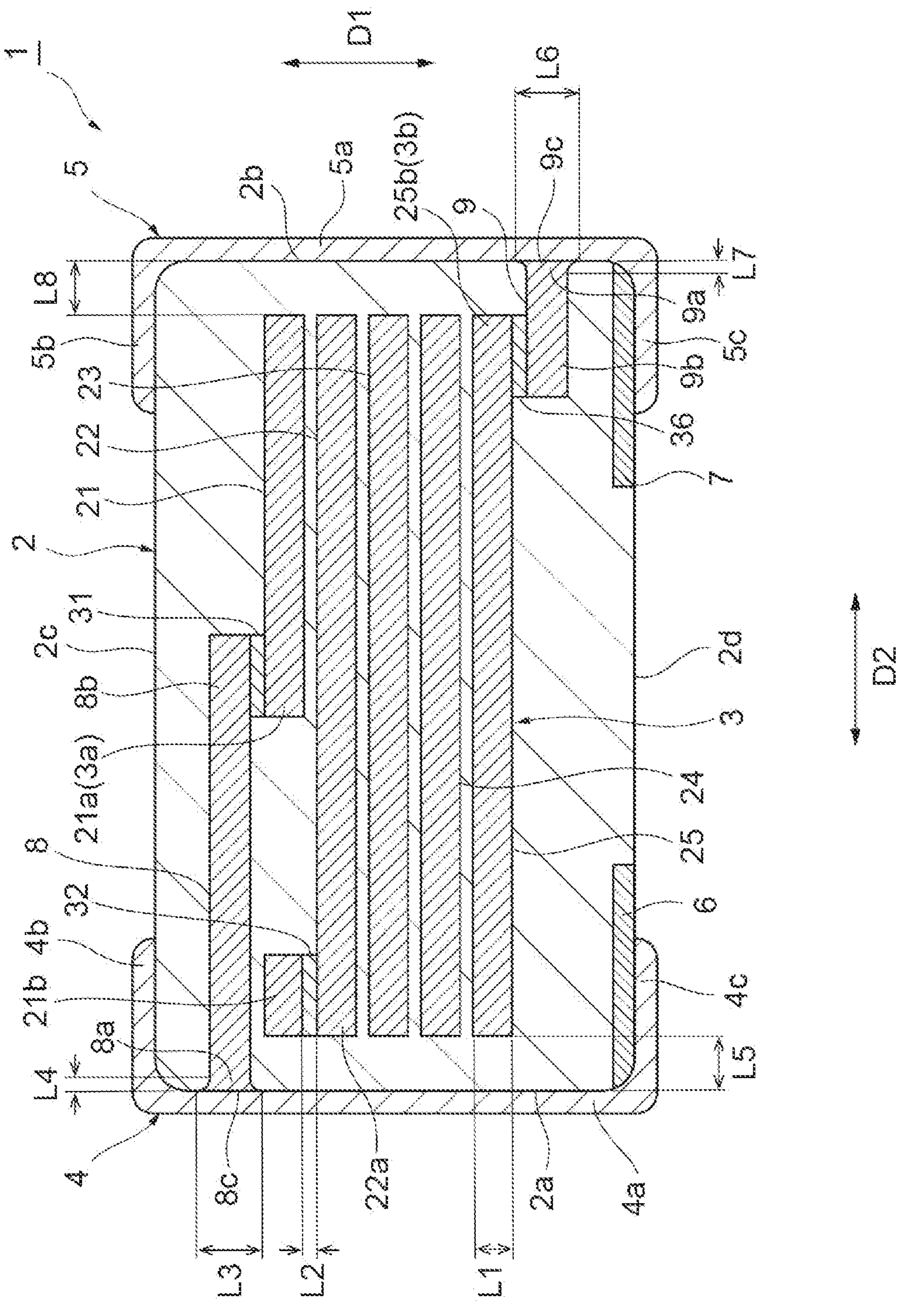
FIG. 3 is a cross-sectional view of the coil component shown in FIG. 1.

As shown in FIG. 3, in the element body 2, a part of the main surface 2*d* forms steps. To be specific, a portion close to each of the end surfaces 2*a* and the end surface 2*b* is recessed toward the main surface 2*c* from the central portion in the main surface 2*d*.

As shown in FIGS. 1 and 3, the first external electrode 4 and the second external electrode 5 are disposed on the element body 2. The first external electrode 4 and the second external electrode 5 are disposed on an outer surface of the element body 2. The first external electrode 4 is located at one end portion of the second direction D2 of the element body 2. The second external electrode 5 is located at the other end portion of the second direction D2 of the element body 2. The first external electrode 4 and the second external electrode 5 are spaced apart from each other in the second direction D2.

The first external electrode 4 includes a first electrode portion 4*a* located on the end surface 2*a*, a second electrode portion 4*b* located on the main surface 2*c*, a third electrode portion 4*c* located on the main surface 2*d*, a fourth electrode portion 4*d* located on the side surface 2*e*, and a fifth electrode portion 4*e* located on a side surface 2*f*. The first electrode portion 4*a* extends along the first direction D1 and the third direction D3 and has a rectangular shape when viewed from the second direction D2. The second electrode portion 4*b* extends along the second direction D2 and the third direction D3 and has a rectangular shape when viewed from the first direction D1. The third electrode portion 4*c* extends along the second direction D2 and the third direction D3 and has a rectangular shape when viewed from the first direction D1. The fourth electrode portion 4*d* extends along the first direction D1 and the second direction D2 and has a rectangular shape when viewed from the third direction D3. The fifth electrode portion 4*e* extends along the first direction D1 and the second direction D2 and has a rectangular shape when viewed from the third direction D3.

The first electrode portion 4*a*, the second electrode portion 4*b*, the third electrode portion 4*c*, the fourth electrode portion 4*d*, and the fifth electrode portion 4*e* are connected at the ridges of the element body 2, and are electrically connected to each other. The first external electrode 4 is formed on five surfaces that include the end surface 2*a*, the pair of main surfaces 2*c* and 2*d*, and the pair of side surfaces 2*e* and 2*f*. The first electrode portion 4*a*, the second electrode portion 4*b*, the third electrode portion 4*c*, the fourth electrode portion 4*d*, and the fifth electrode portion 4*e* are integrally formed.

The second external electrode 5 includes a first electrode portion 5*a* located on the end surface 2*b*, a second electrode portion 5*b* located on the main surface 2*c*, a third electrode portion 5*c* located on the main surface 2*d*, a fourth electrode portion 5*d* located on the side surface 2*e*, and a fifth electrode portion 5*e* located on the side surface 2*f* The first electrode portion 5*a* extends along the first direction D1 and the third direction D3 and has a rectangular shape when viewed from the second direction D2. The second electrode portion 5*b* extends along the second direction D2 and the third direction D3 and has a rectangular shape when viewed from the first direction D1. The third electrode portion 5*c* extends along the second direction D2 and the third direction D3 and has a rectangular shape when viewed from the first direction D1. The fourth electrode portion 5*d* extends along the first direction D1 and the second direction D2 and has a rectangular shape when viewed from the third direction D3. The fifth electrode portion 5*e* extends along the first direction D1 and the second direction D2 and has a rectangular shape when viewed from the third direction D3.

The first electrode portion 5*a*, the second electrode portion 5*b*, the third electrode portion 5*c*, the fourth electrode portion 5*d*, and the fifth electrode portion 5*e* are connected at the ridges of the element body 2, and are electrically connected to each other. The second external electrode 5 are formed on five surfaces that include the end surface 2*b*, the pair of main surfaces 2*c* and 2*d*, and the pair of side surfaces 2*e* and 2*f*. The first electrode portion 5*a*, the second electrode portion 5*b*, the third electrode portion 5*c*, the fourth electrode portion 5*d*, and the fifth electrode portion 5*e* are integrally formed.

The first external electrode 4 and the second external electrode 5 are conductive resin layers. As the conductive resin, a thermosetting resin mixed with a conductive material, an organic solvent and the like is used. As the conductive material, for example, a conductive filler is used. The conductive filler is a metal powder. As the metal powder, for example, Ag powder is used. As the thermosetting resin, for example, a phenol resin, an acrylic resin, a silicone resin, an epoxy resin, or a polyimide resin is used.

The first electrode part 6 and the second electrode part 7 are located in the main surface 2*d* so as to be spaced apart from each other in the second direction D2. The first electrode part 6 and the second electrode part 7 have rectangular shapes when viewed from the first direction D1 and extend along the second direction D2 and the third direction D3. The first electrode part 6 and the second electrode part 7 are provided on the entire main surface 2*d* of the third direction D3.

The first electrode part 6 is provided so as to fill the step provided on the end surface 2*a* side of the main surface 2*d*. The first electrode part 6 is flush with the main surface 2*d*, the end surface 2*a*, the side surface 2*e*, and the side surface 2*f* It can be said that the first electrode part 6 is buried in the element body 2 so as to be exposed from the main surface 2*d*, the end surface 2*a*, the side surface 2*e* and the side surface 2*f*. The second electrode part 7 is provided so as to fill the step provided on the end surface 2*b* side of the main surface 2*d*. The second electrode part 7 is flush with the main surface 2*d*, the end surface 2*b*, the side surface 2*e*, and the side surface 2*f* It can be said that the second electrode part 7 is buried in the element body 2 so as to be exposed from the main surface 2*d*, the end surface 2*b*, the side surface 2*e* and the side surface 2*f*.

As shown in FIG. 2, the first electrode part 6 and the second electrode part 7 are provided so as to sandwich the element body layer 10*p* in the second direction D2. The first electrode part 6, the second electrode part 7, and the element body layer 10*p* have the same thicknesses, that is, the same lengths in the first direction D1. The first electrode part 6 and the second electrode part 7 are, for example, printing pastes or plated conductors. The first electrode part 6 and the second electrode part 7 contain electrically conductive material. The conductive material is, for example, Ag, Pd, Cu, Al, or Ni.

As shown in FIGS. 2 and 3, the coil component 1 further includes a coil 3, the first connection conductor 8 and the second connection conductor 9.

The coil 3 is disposed in the element body 2. In the present embodiment, the coil 3 is disposed at the center of the element body 2 in the second direction D2 and the third direction D3. In other words, a separation distance between the coil 3 and the end surface 2*a* is equal to a separation distance between the coil 3 and the end surface 2*b*. A separation distance between the coil 3 and the side surface 2*e* is equal to a separation distance between the coil 3 and the side surface 2*f*. In the present specification, the separation distance means the shortest separation distance.

The coil 3 includes coil conductors 21 to 25 and through-hole conductors 31 to 36 which are electrically connected to each other. The coil conductors 21 to 25 and the through-hole conductors 31 to 36 are inner conductors disposed inside the coil 3 together with the first connection conductor 8 and the second connection conductor 9. The internal conductor is, for example, a plated conductor. The inner conductor includes an electrically conductive material. The conductive material is, for example, Ag, Pd, Cu, Al, or Ni. The inner conductors are made of the same material, for example. The inner conductor is made of, for example, the same material as the first electrode part 6 and the second electrode part 7.

The coil axes of the coils 3 are provided along the first direction D1. The coil conductors 21 to 25 are arranged so as to at least partially overlap each other when viewed from the first direction D1. One end portion 21*a* of a coil conductor 21 constitutes one end portion 3*a* of the coil 3. The other end portion 21*b* of the coil conductor 21 is connected by a through-hole conductor 32 to one end portion 22*a* of a coil conductor 22. The other end portion 22*b* of the coil conductor 22 is connected by a through-hole conductor 33 to one end portion 23*a* of a coil conductor 23. The other end portion 23*b* of the coil conductor 23 is connected by a through-hole conductor 34 to one end portion 24*a* of a coil conductor 24. The other end portion 24*b* of the coil conductor 24 is connected by a through-hole conductor 35 to one end portion 25*a* of a coil conductor 25. The other end portion 25*b* of the coil conductor 25 constitutes the other end portion 3*b* of the coil 3.

Each of the end portions 21*a* to 25*a* and 21*b* to 25*b* of the coil conductors 21 to 25 is formed in a circular shape when viewed from the first direction D1. When viewed from the first direction D1, the diameter of each end portion 21*a* to 25*a* and 21*b* to 25*b* is greater than a line width W1 of each coil conductor 21 to 25. The line width W1 is line widths of the portions other than the end portions 21*a* to 25*a* and 21*b* to 25*b* of the coil conductors 21 to 25. Since each end portion 21*a* to 25*a* and 21*b* to 25*b* is enlarged, the end portions 21*a* to 25*a* and 21*b* to 25*b* can be easily connected to the through-hole conductors 31 to 36. The line width W1 is, for example, 5 μm or more 300 μm or less. The diameter of each end portion 21*a* to 25*a* and 21*b* to 25*b* is equivalent to the diameters of each through-hole conductor 31 to 36, and is, for example, 10 μm or more 300 μm or less.

The coil conductor 21 is provided on the element body layer 10*d*. The coil conductor 22 is provided on the element body layer 10*f*. The coil conductor 23 is provided on the element body layer 10*h*. The coil conductor 24 is provided on the element body layer 10*j*. The coil conductor 25 is provided on the element body layer 10*l*. The coil conductors 21 to 25 are provided so as to pass through the corresponding element body layer 10*d*, 10*f*, 10*h*, 10*j*, and 10*l* in the thickness direction (that is, the first direction D1) thereof.

The lengths L1 of the coil conductors 21 to 25 in the first direction D1 are equal to each other in present embodiment. The lengths L1 of the coil conductors 21 to 25 in the first direction D1 are equivalent to the thicknesses of the corresponding element body layer 10*d*, 10*f*, 10*h*, 10*j* and 10*l*.

The through-hole conductor 31 is provided on the element body layer 10*c*. The through-hole conductor 32 is provided on the element body layer 10*e*. The through-hole conductor 33 is provided on the element body layer 10*g*. The through-hole conductor 34 is provided on the element body layer 10*i*. The through-hole conductor 35 is provided on the element body layer 10*k*. The through-hole conductor 36 is provided on the element body layer 10*m*. Each of the through-hole conductors 31 to 36 is provided so as to pass through the corresponding element body layer 10*c*, 10*e*, 10*g*, 10*i*, 10*k*, and 10*m* in the thickness direction (that is, the first direction D1) thereof.

The lengths L2 of the through-hole conductors 31 to 36 in the first direction D1 are equal to each other in present embodiment. The lengths L2 of the through-hole conductors 31 to 36 in the first direction D1 are equal to the thicknesses of the corresponding element body layers 10*c*, 10*e*, 10*g*, 10*i*, 10*k*, and 10*m*. The lengths L2 are equal to each of a separation distance between adjacent coil conductors 21 to 25, a separation distance between the first connection conductor 8 and the coil conductor 21, and a separation distance between the second connection conductor 9 and the coil conductor 25. The lengths L1 are longer than the lengths L2.

The first connection conductor 8 connects one end portion 3*a* of the coil 3 to the first electrode portion 4*a* of the first external electrode 4. The first connection conductor 8 extends in the second direction D2. The first connection conductor 8 has a first end portion 8*a* and a second end portion 8*b*. The first end portion 8*a* is exposed from the end surface 2*a* and connected to the first electrode portion 4*a*. The first end portion 8*a* includes a connection surface 8*c* in contact with the first electrode portion 4*a*.

The second end portion 8*b* is connected to one end portion 3*a* of the coil 3 by the through-hole conductor 31. The second end portion 8*b* is formed in a circular shape when viewed from the first direction D1. As viewed from the first direction D1, the diameter of the second end portion 8*b* is greater than the line widths of portions other than both end portions 8*a* and 8*b* of the first connection conductor 8. Since the second end portion 8*b* is enlarged in this manner, the second end portion 8*b* and the through-hole conductor 31 are easily connected. When viewed from the first direction D1, the line widths of the portions other than both end portions 8*a* and 8*b* of the first connection conductor 8 are equivalent to the line width W1 of each coil conductors 21 to 25.

The second connection conductor 9 connects the other end portion 3*b* of the coil 3 and the first electrode portion 5*a* of the second external electrode 5. The second connection conductor 9 extends in the second direction D2. The second connection conductor 9 has a first end portion 9*a* and a second end portion 9*b*. The first end portion 9*a* is exposed from the end surface 2*b* and connected to the first electrode portion 5*a*. The first end portion 9*a* includes a connection surface 9*c* in contact with the first electrode portion 5*a*.

The second end portion 9*b* is connected to the other end portion 3*b* of the coil 3 by the through-hole conductor 36. The second end portion 9*b* is formed in a circular shape when viewed from the first direction D1. As viewed from the first direction D1, the diameter of the second end portion 9*b* is greater than the line widths of portions other than both end portions 9*a* and 9*b* of the second connection conductor 9. Since the second end portion 9*b* is enlarged in this manner, the second end portion 9*b* and the through-hole conductor 36 are easily connected. When viewed from the first direction D1, the line widths of the portions other than both end portions 9*a* and 9*b* of the second connection conductor 9 are equivalent to the line width W1 of each coil conductor 21 to 25.

Figure 4:
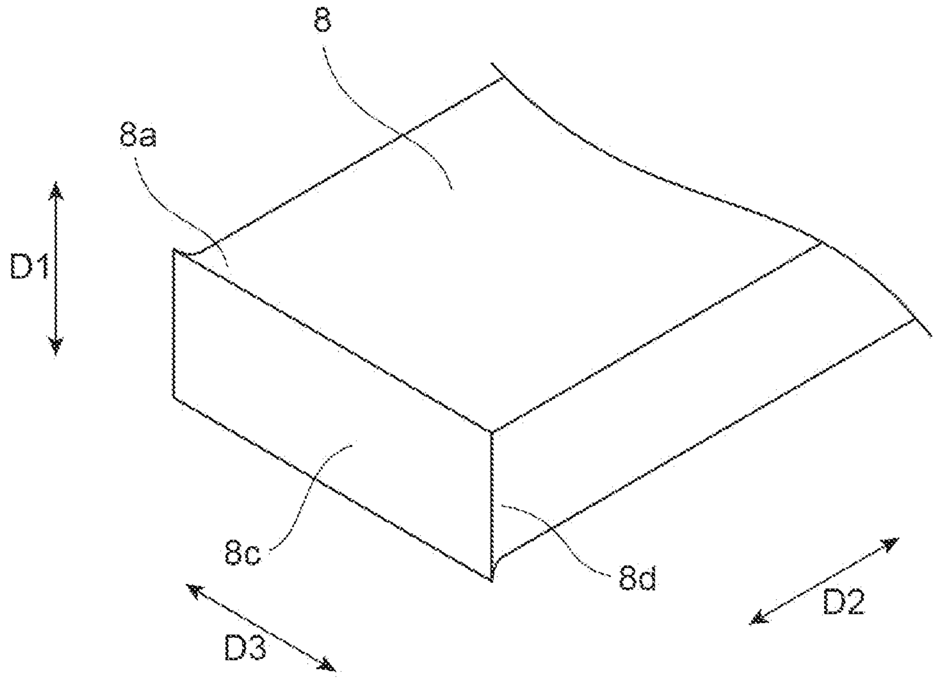
FIG. 4 is a perspective view showing a first end portion of a first connection conductor.

As shown in FIGS. 2 to 4, the first end portion 8*a* of the first connection conductor 8 has a shape in which the cross-sectional area of the first end portion 8*a* (cross-sectional area parallel to the end surface 2*a* or cross-sectional area orthogonal to the second direction D2, which is the longitudinal direction of the first connection conductor 8) gradually increase toward the first electrode portion 4*a*. The first connection conductor 8 has a shape that spreads outward over the entire circumference of the first end portion 8*a*. The first end portion 8*a* has a tapered shape gradually expanding outward over the entire circumference toward the first electrode portion 4*a*. The outer surface 8*d* of the first end portion 8*a* (see FIG. 5) has a tapered shape in all cross sections orthogonal to the end surface 2*a*. The outer surface 8*d* is curved so as to be recessed to the inside of the first connection conductor 8 in a cross section orthogonal to the end surface 2*a*, and has an R shape. The first end portion 8*a* has a tapered shape throughout the second direction D2.

The length L3 (maximum length) of the first end portion 8*a* in the first direction D1 is longer than the lengths L1 of coil conductors 21 to 25 in the first direction D1. The length L3 is, for example, 5 μm or more 150 μm or less. When viewed from the first direction D1, a line width W2 of the first end portion 8*a* (the maximum length of the first end portion 8*a* in the third direction D3) is greater than the line widths W1 of the coil conductors 21 to 25. The line width W2 is, for example, 10 μm or more 400 μm or less.

A length L4 of the first end portion 8*a* in the longitudinal direction (the second direction D2) of the first connection conductor 8 is half or less of a separation distance L5 between coil conductors 21 to 25 and the first external electrode 4. The first end portion 8*a* does not overlap the coil conductors 21 to 25 when viewed from the first direction D1. The length L4 is, for example, equivalent to the curvature radius of the outer surface 8*d* in a cross section orthogonal to the end surface 2*a*. The length L4 is, for example, 5 μm or more and 30 μm or less. The separation distance L5 is, for example, 30 μm or more 150 μm or less.

The lengths L2 are shorter than the separation distance L5. The lengths L2 are the lengths of the through-hole conductors 31 to 36 as described above, and are equivalent to the thicknesses of the element body layers 10*c*, 10*e*, 10*g*, 10*i*, 10*k*, and 10*m*. Therefore, the lengths L2 are equal to the separation distance between two adjacent internal conductors among the coil conductors 21 to 25, the first connection conductor 8, and the second connection conductor 9.

Although a perspective view of the second connection conductor 9 is omitted, the first end portion 9*a* of the second connection conductor 9 has the same shape as the first end portion 8*a* of the first connection conductor 8. The first end portion 9*a* has a shape in which the cross section of the first end portion 9*a* (the cross section parallel to the end surface 2*b* or the cross section perpendicular to the second direction D2, which is the longitudinal direction of the second connection conductor 9) gradually increases toward the first electrode portion 5*a*. The second connection conductor 9 has a shape that spreads outward over the entire circumference of the first end portion 9*a*. The first end portion 9*a* has a tapered shape gradually expanding outward over the entire circumference toward the first electrode portion 5*a*. The outer surface of the first end portion 9*a* has a tapered shape in all cross sections perpendicular to the end surface 2*b*. The outer surface of the first end portion 9*a* is curved so as to be recessed toward the inside of the second connection conductor 9 in a cross section orthogonal to the end surface 2*b*, and has an R shape. The first end portion 9*a* has a tapered shape throughout the second direction D2.

The length L6 (maximum lengths) of the first end portion 9*a* in the first direction D1 is longer than the lengths L1. The lengths L6 are equivalent to the lengths L3. When viewed from the first direction D1, the line width W3 of the first end portion 9*a* (the maximum length of the first end portion 9*a* in the third direction D3) is greater than the line widths W1 of the coil conductors 21 to 25. The length L7 of the first end portion 9*a* in the longitudinal direction (the second direction D2) of the second connection conductor 9 is half or less of a separation distance L8 between the coil conductors 21 to 25 and the second external electrode 5. The length L7 is equivalent to the lengths L4. The separation distance L8 is equivalent to the separation distance L5. The first end portion 9*a* does not overlap the coil conductors 21 to 25 when viewed from the first direction D1. The length L7 is, for example, equal to the curvature radius of the outer surface of the first end portion 9*a* in a cross-section orthogonal to the end surface 2*b*.

As shown in FIG. 5, two or more soft magnetic metal particles M are arranged along the first direction D1 between the coil conductor 21 and the first connection conductor 8 adjacent to each other in the first direction D1. In FIG. 5, hatching of resins present between the soft magnetic metal particles M portions is omitted. Although a partially enlarged view of the second connection conductor 9 is not shown, two or more soft magnetic metal particles M are also arranged along the first direction D1 between the coil conductor 25 and the second connection conductor 9 adjacent to each other in the first direction D1.

Next, a method of manufacturing the coil component 1 will be described.

The soft magnetic metal particles M, insulating resins, solvents and the like are mixed to prepare slurry. The prepared slurry is provided on a base material (for example, a polyethylene terephthalate film) by, for example, a screen printing method or a doctor-blade method to form a plurality of green sheets serving as the plurality of element body layers 10*a* on the base material. Similarly, a plurality of green sheets serving as the plurality of element body layers 10*o* is formed on the base material.

A conductor pattern to be the first connection conductor 8 is formed on a base material by screen printing or plating. Subsequently, the slurry is applied onto the base material by, for example, the screen printing method so as to fill the periphery of the conductor pattern. Thus, a plurality of green sheets serving as the plurality of element body layers 10*b* is formed on the base material. A plurality of green sheets which becomes the plurality of element body layers 10*c* to 10*n* and 10*p* is also formed so as to fill the periphery after forming the corresponding conductor pattern on a base material.

Next, green sheets to be element body layers 10*a* to 10*p* are transferred and laminated together with the conductor pattern in this order. The green sheets are pressed from the laminating direction to form a laminate. Subsequently, the laminate of the green sheets is fired to form a laminate substrate. Subsequently, the laminate substrate is cut into chips of a predetermined size by a cutting machine including a rotary blade to form individualized laminates.

In the above-described step of forming the conductor pattern, the conductor pattern serving as the first connection conductor 8 and the second connection conductor 9 is formed so as to cover a portion serving as a cutting margin in the step of cutting the laminate substrate. For example, one of adjacent conductor patterns may be inverted so that conductor patterns serving as the first connection conductor 8 are continuous through the portion serving as the cutting margin, and conductor patterns serving as the second connection conductor 9 may be continuous through the portion serving as the cutting margin. The first end portion 8*a* and the first end portion 9*a* can be formed into a desired shape by scraping the conductor of the cutting margin by the rotary blade. The shapes of the first end portion 8*a* and the first end portion 9*a* are appropriately adjusted according to cutting conditions such as the materials of the element body 2 and the conductor and the rotation speed of the rotary blade.

Subsequently, the laminate is immersed in a resin solution to impregnate the laminate with the resin. Thus, the element body 2 is formed. Resin electrode layers serving as the first external electrode 4 and the second external electrode 5 are formed on both end portions of the element body 2 by, for example, a dipping method. As described above, the coil component 1 is formed.

As described above, in the coil component 1 according to the present embodiment, the first connection conductor 8 has a shape that spreads outward over the entire circumference in the first end portion 8*a*. This increases the junction area between the first connection conductor 8 and the first external electrode 4. Therefore, the junction strength between the first connection conductor 8 and the first external electrode 4 can be improved. The second connection conductor 9 has a shape that spreads outward over the entire circumference in the first end portion 9*a*. This increases the junction area between the second connection conductor 9 and the second external electrode 5. Therefore, the junction strength between the second connection conductor 9 and the second external electrode 5 can be improved.

The first end portion 8*a* has a shape in which the cross section gradually increases toward the first external electrode 4. This increases the junction area between the first connection conductor 8 and the first external electrode 4. Therefore, the junction strength between the first connection conductor 8 and the first external electrode 4 can be improved. The first end portion 9*a* has a shape in which the cross section gradually increases toward the second external electrode 5. This increases the junction area between the second connection conductor 9 and the second external electrode 5. Therefore, the junction strength between the second connection conductor 9 and the second external electrode 5 can be improved.

The element body 2 includes the plurality of soft magnetic metal particles M.

The length L3 of the first end portion 8*a* in the first direction D1 is longer than the lengths L1 of the coil conductors 21 to 25 in the first direction D1. This increases the junction area between the first connection conductor 8 and the first external electrode 4. Therefore, the junction strength between the first connection conductor 8 and the first external electrode 4 can be improved. In addition, two or more soft magnetic metal particles M are arranged between the first connection conductor 8 and the coil conductor 21 along the first direction D1. As a result, the interlayer withstand voltage between the first connection conductor 8 and the coil conductor 21 can be improved. The length L6 of the first end portion 9*a* in the first direction D1 is longer than the length L1. This increases the junction area between the second connection conductor 9 and the second external electrode 5. Therefore, the junction strength between the second connection conductor 9 and the second external electrode 5 can be improved. Also, two or more soft magnetic metal particles M are arranged between the second connection conductor 9 and the coil conductor 25 along the first direction D1. As a result, withstand voltage between the second connection conductor 9 and a coil conductor 26 layers can be improved.

When viewed from the first direction D1, the line width W2 of the first end portion 8*a* is greater than the line widths W1 of coil conductors 21 to 25. Therefore, the junction area between the first connection conductor 8 and the first external electrode 4 are reliably increased. Therefore, the junction strength between the first connection conductor 8 and the first external electrode 4 can be reliably improved. When viewed from the first direction D1, the line width W3 of the first end portion 9*a* is greater than the line widths W1 of coil conductors 21 to 25. Therefore, the junction area between the second connection conductor 9 and the second external electrode 5 are reliably increased. Therefore, the junction strength between the second connection conductor 9 and the second external electrode 5 can be reliably improved.

The first external electrode 4 and the second external electrode 5 are conductive resin layers. Therefore, the densities of metal particles in the first external electrode 4 and the second external electrode 5 are lower than those in a configuration in which the first external electrode 4 and the second external electrode 5 are sintered metal layers. Therefore, the stray capacitance between the first external electrode 4 and the second external electrode 5 and the coil conductors 21 to 25 can be suppressed.

The length L4 of the first end portion 8*a* is half or less of the separation distance L5 between the coil conductor 21 and the first external electrode 4. Thus, the withstand voltage between the first end portion 8*a* and the coil conductor 21 can be secured. The length L7 of the first end portion 9*a* is half or less of the separation distance L8 between the coil conductor 25 and the second external electrode 5. Thus, the withstand voltage between the first end portion 9*a* and the coil conductor 25 can be secured.

The outer surface 8*d* of the first end portion 8*a* is curved so as to be recessed inward of the first connection conductor 8 in a cross section orthogonal to the end surface 2*a*. For this reason, it is easy to secure the withstand voltage between the first end portion 8*a* and the coil conductor 21. The outer surface of the first end portion 9*a* is curved so as to be recessed inward of the second connection conductor 9 in a cross section orthogonal to the end surface 2*b*. For this reason, it is easy to secure the withstand voltage between the first end portion 9*a* and the coil conductor 25.

The separation distance between adjacent coil conductors 21 to 25 is equal to the length L2. The separation distance L5 between the first external electrode 4 and the coil conductors 21 to 25 is longer than the length L2. The voltage between the coil conductors 22 to 25 and the first external electrode 4 is greater than the voltage between adjacent coil conductors 21 to 25. Since the separation distance L5 is longer than the length L2, the withstand voltage of the coil 3 is easily secured. The separation distance L8 between the second external electrode 5 and the conductors 21 to 25 is longer than the length L2. The voltage applied between the coil conductors 21 to 24 and the second external electrode 5 is greater than the voltage applied between adjacent coil conductors 21 to 25. Since the separation distance L8 is longer than the length L2, the withstand voltage of the coil 3 is easily secured.

The first connection conductor 8 and the second connection conductor 9 may be plated conductors. In the case of the plated conductors, the densities of the first connection conductor 8 and the second connection conductor 9 can be increased as compared with the case where the first connection conductor 8 and the second connection conductor 9 are sintered metal conductors. Therefore, the junction area between the first connection conductor 8 and the first external electrode 4 can be further increased. In addition, the junction area between the second connection conductor 9 and the second external electrode 5 can be further increased. The coil conductors 21 to 25 may also be plated conductors. In the case of the plated conductors, for example, the density of the conductor can be increased, and the electrical resistivity of the conductor can be decreased. Thus, the characteristics of the coil 3 can be improved.

Although the embodiments of the present invention have been described above, the present invention is not necessarily limited to the above-described embodiments, and various modifications can be made without departing from the scope of the present invention.

The element body 2 does not necessarily include soft magnetic metal particles, and may be made of ferrite (for example, Ni—Cu—Zn ferrite, Ni—Cu—Zn—Mg ferrite, or Cu—Zn ferrite), a dielectric material, or the like. The coil conductors 21 to 25, the through-hole conductors 31 to 36, the first connection conductor 8, the second connection conductor 9, the first electrode part 6, and the second electrode part 7 may be sintered metal conductors.

The second end portion 8*b* of the first connection conductor 8, the second end portion 9*b* of the second connection conductor 9, and the end portions 21*a* to 25*a* and 21*b* to 25*b* of the coil conductors 21 to 25 are enlarged when viewed from the first direction D1, but may not be enlarged. In this case, the first connection conductor 8, the second connection conductor 9, and coil conductors 21 to 25 are formed with the line width W1 up to each end portion.

The first connection conductor 8 and the coil conductor 21 are disposed on the element body layers different from each other, but may be disposed on the same element body layer. In this case, the first connection conductor 8 and the coil conductor 21 are directly connected so as to be continuous within the same element body layer without the through-hole conductor 31. The second connection conductor 9 and the coil conductor 25 are disposed on the element body layers different from each other, but may be disposed on the same element body layer. In this case, the second connection conductor 9 and the coil conductor 25 are directly connected so as to be continuous within the same element body layer without the through-hole conductor 36.

While the first connection conductor 8 is exposed to the end surface 2*a* and the second connection conductor 9 is exposed to the end surface 2*b*, the first connection conductor 8 and the second connection conductor 9 may be exposed to the main surface 2*d*. In this case, the first external electrode 4 and the second external electrode 5 may be bottom electrodes provided on the main surface 2*d*. Also, the laminating direction of the element body layers may be the second direction D2 or the third direction D3.

The first end portion 8*a* and the first end portion 9*a* may have different shapes from each other. At least one of the first end portion 8*a* and the first end portion 9*a* may have a shape expanding outward over the entire circumference toward the first external electrode 4 and the second external electrode 5.

The invention claimed is:

1. A coil component comprising:
an element body;
a coil including a plurality of coil conductors disposed in the element body, and electrically connected to each other, and laminated such that at least parts of the coil conductors overlap each other when viewed from a lamination direction;
an external electrode disposed on the element body; and
a connection conductor that connects the coil and the external electrode,
wherein the connection conductor has an end portion exposed from an outer surface of the element body and connected to the external electrode,
the end portion has a shape protruding outward with respect to other parts of the connection conductor over an entire circumference of the end portion, and
the external electrode and the connection conductor are made of different materials from each other.

2. A coil component comprising:
an element body;
a coil including a plurality of coil conductors disposed in the element body, and electrically connected to each other, and laminated such that at least parts of the coil conductors overlap each other when viewed from a lamination direction;
an external electrode disposed on the element body; and
a connection conductor that connects the coil and the external electrode,
wherein the connection conductor has an end portion exposed from an outer surface of the element body and connected to the external electrode,
an entire region of the end portion has a shape in which a cross-sectional area of the end portion uniformly and monotonically increases toward the external electrode, and
the external electrode and the connection conductor are made of different materials from each other.

3. The coil component according to claim 1, wherein the element body includes a plurality of element body layers laminated in a first direction, and
each of the plurality of element body layers includes a plurality of soft magnetic metal particles.

4. A coil component comprising:
an element body;
a coil including a plurality of coil conductors disposed in the element body, and electrically connected to each other, and laminated such that at least parts of the coil conductors overlap each other when viewed from a lamination direction;
an external electrode disposed on the element body; and
a connection conductor that connects the coil and the external electrode,
wherein the element body includes a plurality of element body layers laminated in a first direction,
each of the plurality of element body layers includes a plurality of soft magnetic metal particles,
the connection conductor has an end portion exposed from an outer surface of the element body and connected to the external electrode, the end portion having a shape protruding outward with respect to other parts of the connection conductor over an entire circumference of the end portion,
a length of the end portion in the first direction is longer than a length of each of the plurality of coil conductors in the first direction, and
two or more soft magnetic metal particles are disposed along the first direction between a coil conductor of the plurality of coil conductors and the connection conductor that are adjacent to each other in the first direction.

5. The coil component according to claim 3, wherein a line width of the end portion is greater than a line width of each of the plurality of coil conductors when viewed from the first direction.

6. The coil component according to claim 1, wherein the external electrode is a conductive resin layer.

7. The coil component according to claim 1, wherein a length of the end portion in a length direction of the connection conductor is half or less of a separation distance between the plurality of coil conductors and the external electrode.

8. The coil component according to claim 1, wherein an outer surface of the end portion is curved so as to taper inward in a cross section orthogonal to the outer surface on which the end portion is exposed.

9. The coil component according to claim 1, wherein a separation distance between the plurality of coil conductors and the external electrode is longer than a separation distance between adjacent coil conductors of the plurality of coil conductors.

10. The coil component according to claim 1, wherein the connection conductor is a plated conductor.

* * * * *